March 15, 1932.  E. W. LITTLE  1,849,100
CAGE SUPPORTING STAND
Filed Aug. 25, 1931
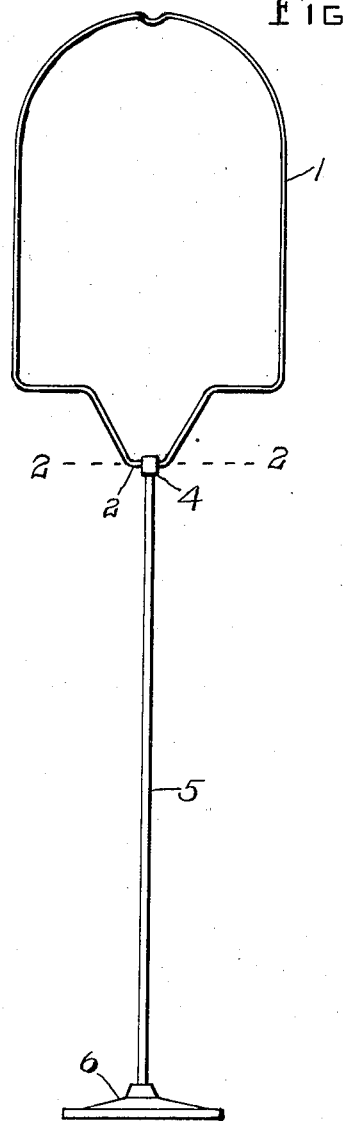
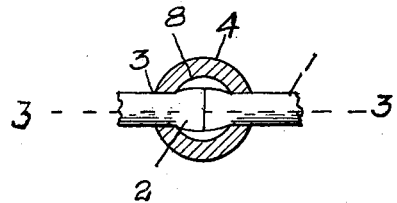
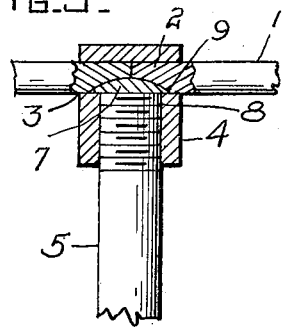
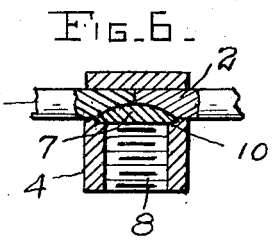
Earl W. Little, Inventor Patented Mar. 15, 1932

1,849,100

UNITED STATES PATENT OFFICE

EARL W. LITTLE, OF INDIANAPOLIS, INDIANA

CAGE SUPPORTING STAND

Application filed August 25, 1931. Serial No. 559,233.

This invention relates to cage supporting stands and is an improvement over the structures shown in my former applications, one feature of the invention being the provision of means for locking the ends of the cage supporting frame to a coupling sleeve or socket.

A further feature of the invention is the provision of means for permanently interlocking the frame and coupling sleeve in assembled relation.

A further feature of the invention is in so constructing the several parts that they may be interlocked with each other by swedging or upsetting the interlocking parts.

Other objects and advantages will be hereinafter more fully set forth.

In the accompanying drawings which are made a part of this application,

Figure 1 is an elevational view of a cage supporting stand.

Figure 2 is an enlarged sectional view as seen along line 2—2, Fig. 1.

Figure 3 is a similar view as seen along line 3—3, Fig. 2.

Figure 4 is a plan view of an interlocking washer structure.

Figure 5 is a similar view showing the shape of the washer after being applied to use, and, Figure 6 is a sectional view showing a modified form of interlocking parts.

Referring to the drawings, the numeral 1 designates the frame portion of a cage supporting stand, which may be of any suitable size and configuration and which is preferably constructed of a single section of wire or rod, the free ends 2 of which are introduced through openings 3 on opposite sides of coupling member 4.

The coupling member 4 is preferably internally threaded for receiving the threaded end of a standard 5, the lower end of the standard being attached to a base member 6 in any suitable manner, the base member being weighted for normally retaining the support in upright position.

In order to prevent the ends 2 of the frame 1 withdrawing from the openings 3 of the coupling member 4, the ends are preferably flattened or upset, so that they will spread out and extend beyond the confines of the openings 3, as indicated in Fig. 2.

To positively prevent the frame 1 from pivoting in the openings 3, a washer like member 7 is entered in the opening 8 of coupling member 4, said washer member 7 being forced into engagement with the ends 2, by any suitable means, with sufficient force to swedge said ends and flatten them out as shown, such swedging action also forcing parts of the washer into the openings 3 and forming interlocking extensions 9, as shown in Figs. 3 and 5. These extensions positively interlock the washer within the coupling 4 and as the washer is resting against the flattened or swedged portions of the ends 2, the frame 1 will be held in rigid formation with the coupling and held against any pivoting action.

In Fig. 6, a modified structure is shown in that a circular shoulder 10 is formed interiorly of the coupling 4, preferably immediately below the openings 3, so that when the washer 7 is forced inwardly to flatten the ends 2, the peripheral edge thereof will be forced outwardly and interlock with the shoulder 10, thus permanently locking the washer within the member 4 and against the flattened ends 2 to prevent rotation of the frame 1.

In assembling the frame with the socket, the ends 2 are entered through the openings 3 and the washer structure entered in the opening 8. Pressure is then applied against the washer 8 with sufficient force to flatten the ends 2 and swedge the edges of the washer into interlocking relation with the coupling member 4.

By assembling the parts in this manner, the stand may be produced at a minimum expense and at the same time permanently and rigidly interlock the parts together.

What I claim is:

1. In cage supporting stands, a coupling member having a central opening and transversely arranged openings through the wall thereof, a frame member the ends of which extend through said transverse openings and a washer structure adapted to be forced against the ends of said frame with parts thereof swedged into locking engagement with said coupling member.

2. In a cage supporting stand, a hollow coupling member having transverse openings through the wall thereof, a frame member the ends of which are adapted to be entered through said transverse openings, and a washer member adapted to be forced into said coupling member for flattening the ends of the frame entering said coupling member and interlock with parts of said coupling member.

3. In a cage supporting stand, a coupling member, a frame member the ends of which are adapted to extend into said coupling member, and a washer structure adapted to be forced against said frame ends for flattening the same, parts of said washer structure being swaged into interlocking engagement with said coupling member.

4. In a cage supporting stand, a coupling member having openings through the wall thereof, a frame member having its ends extended through said openings, and a washer structure adapted to be forced into engagement with the ends of said frame member and having parts thereof swedged into said openings for interlocking said washer structure with said coupling member.

In testimony whereof I hereto affix my signature.

EARL W. LITTLE.